United States Patent
Enders et al.

(10) Patent No.: US 7,304,401 B2
(45) Date of Patent: Dec. 4, 2007

(54) TRANSMITTER/RECEIVING DEVICE FOR A MOTOR VEHICLE COMPONENT CONNECTED TO A COMMUNICATIONS NETWORK

(75) Inventors: Thorsten Enders, Illingen (DE); Juergen Schirmer, Hiedelberg (DE); Frank Stiegler, Ludwigsburg (DE); Klaus Dostert, Krickenbach (DE)

(73) Assignee: Robert Bosch GmbH, Stuttgart (DE)

( * ) Notice: Subject to any disclaimer, the term of this patent is extended or adjusted under 35 U.S.C. 154(b) by 277 days.

(21) Appl. No.: 10/515,287

(22) PCT Filed: Dec. 17, 2003

(86) PCT No.: PCT/DE03/04160

§ 371 (c)(1), (2), (4) Date: Nov. 19, 2004

(87) PCT Pub. No.: WO2004/067328

PCT Pub. Date: Aug. 12, 2004

(65) Prior Publication Data

US 2005/0206240 A1 Sep. 22, 2005

(30) Foreign Application Priority Data

Jan. 17, 2003 (DE) ................. 103 01 637

(51) Int. Cl.
*B60L 1/00* (2006.01)

(52) U.S. Cl. ...................... 307/9.1; 307/10.1

(58) Field of Classification Search ............... 307/9.1, 307/10.1
See application file for complete search history.

(56) References Cited

U.S. PATENT DOCUMENTS

| 5,432,817 A * | 7/1995 | Hormel et al. ............ 375/257 |
| 6,469,404 B1 * | 10/2002 | Pohjola ................. 307/10.1 |
| 2003/0076221 A1 * | 4/2003 | Akiyama et al. ....... 340/310.01 |

FOREIGN PATENT DOCUMENTS

| DE | 199 13 919 | 10/2000 |
| DE | 101 42 408 | 4/2003 |
| DE | 101 42 410 | 4/2003 |

* cited by examiner

*Primary Examiner*—Robert L. DeBeradinis
(74) *Attorney, Agent, or Firm*—Kenyon & Kenyon LLP

(57) ABSTRACT

A transmitter/receiver device for a motor vehicle component connected to a communications network, and includes at least one transmitter unit for transmitting data over the communications network, and at least one receiver unit for receiving data over the communications network. The communications network is used for transmitting data between the component and further components connected to the communications network. To ensure a reliable, efficient, and interference-resistant communication between the different components within the motor vehicle, the transmitter/receiver device contains a plurality of transmitter units, each transmitter unit providing at least one separate channel for transmitting data over the communications network; and/or that the transmitter/receiver device contain a plurality of receiver units, each receiver unit providing at least one separate channel for receiving data over the communications network.

10 Claims, 6 Drawing Sheets

TRANSMITTER/RECEIVING DEVICE FOR A MOTOR VEHICLE COMPONENT CONNECTED TO A COMMUNICATIONS NETWORK

FIELD OF THE INVENTION

The present invention relates to a transmitter/receiver device for a motor vehicle component connected to a communications network. The present invention also relates to a communications system located in a motor vehicle, including a communications network and a plurality of motor vehicle components connected thereto.

BACKGROUND INFORMATION

At present, communication within a motor vehicle between different motor vehicle components, such as a door controller and a seat controller, takes place, among other things, using a bus system operating, for example, according to the CAN (Controller Area Network) standard, or according to the LIN (Local Interconnect Network) standard.

Prior patent applications of the applicant discuss, for a motor vehicle electrical system, which is basically used for supplying power to motor vehicle components, and which is also used for transmitting data between the components (compare German patent applications nos. 101 42 408 and 101 42 410, both filed on Aug. 31, 2001). This communication method via the motor vehicle electrical system for power supply is also referred to as "powerline communications".

Communication between the components via existing bus systems and/or over powerline communications requires powerful and interference-resistant transmitter/receiver devices (so-called "transceivers") that guarantee reliable communication even under difficult conditions. A transceiver implements the access of a component to a communications network.

Interferences that may affect data transmission can be caused by line-conducted impulse noise, but also by impulse noise that radiates interference pulses into the vehicle electrical system. Line-conducted impulse noise can be caused, for example, by switching operations of electrical loads, or by ignition processes. These are, in particular, all kinds of switching operations of an on-board electrical load connected to the vehicle electrical system, such as the seat adjuster, horn, lighting, etc. Interfering ignition processes occur, in particular, in the case of a high-voltage ignition system as is used, for example, in Otto engines.

In particular, the transceivers must also be able to transmit, without delay, messages of safety-related applications, such as air-bag triggering, or brake interventions of a vehicle stability control system.

SUMMARY OF THE INVENTION

It is an object of the exemplary embodiment and/or exemplary method of the present invention to ensure a reliable, efficient, and interference-resistant communication between different components within a motor vehicle.

To achieve this objective, the exemplary embodiment and/or exemplary method of the present invention, based on the transmitter/receiver device of the type mentioned at the outset, proposes that the transmitter/receiver device have a plurality of transmitter units, each transmitter unit providing at least one separate channel for transmitting data over the communications network, and/or that the transmitter/receiver device have a plurality of receiver units, each receiver unit providing at least one separate channel for receiving data over the communications network.

The exemplary embodiment and/or exemplary method of the present invention relates to a transmitter/receiver device for a motor vehicle component connected to a communications network. The transmitter/receiver device includes at least one transmitter unit for transmitting data over the communications network, and at least one receiver unit for receiving data over the communications network. The communications network is used for transmitting data between the component and further components connected to the communications network. Moreover, the exemplary embodiment and/or exemplary method of the present invention relates to a communications system located in a motor vehicle, including a communications network and a plurality of motor vehicle components connected thereto. The components each contain a transmitter/receiver device including at least one transmitter unit for transmitting data over the communications network, and at least one receiver unit for receiving data over the communications network. The communications network is used for transmitting data between the components.

The transmitter/receiver device (so-called "transceiver") according to the present invention supports communication over the entire communications network, in particular, direct point-to-point communication, between specific components within the motor vehicle without time delay on so-called "special channels". Due to the use of the transceivers (described herein) in a communications network, powerline communications is suitable for using different services, bus systems, and applications in parallel. Using the transceiver according to the present invention, the power supply lines of a motor vehicle electrical system, which is basically used for supplying power to the motor vehicle components, can be used for integrated transmission of power and information, which eliminates the need for separate data lines, such as in the case of a CAN bus. By using a suitable transmission method in conjunction with a method for signal recovery, the overall system turns out to be essentially insensitive to additive interference caused by switching operations of the components connected to the vehicle electrical system.

A further important aspect of the transceiver according to the present invention is the provision of special channels for the transmission of safety-related messages. This allows a message to be immediately transmitted without any time delay caused by possible timing cycles to be waited for at the protocol level of a multi-user bus system having only one channel. By supporting the parallel operation of a plurality of bus systems on one medium, further data lines may be saved because, for example, the data traffic of LIN and CAN bus systems may be run simultaneously over the same medium. Thus, powerline communications can at the same time be used, inter alia, as a fallback system for different bus systems so as to maintain data transmission via the motor vehicle electrical system when one of the bus systems fails. The individual channels for the different bus systems can be separated either using orthogonal codes, or by the respective frequency range used. The signal shapes used are selected to be orthogonal so that the carrier signals of the individual channels are placed very close together.

The exemplary embodiment and/or exemplary method of the present invention provides that at least one of the channels be arranged or configured to transmit and/or receive data over a motor vehicle electrical system; the motor vehicle electrical system being used for supplying power to the component and for transmitting data between the component and further components connected to the motor vehicle electrical system. A communications method of this kind is also referred to as "powerline communications".

The exemplary embodiment and/or exemplary method of the present invention provides that the transmission and/or the reception of data over the motor vehicle electrical system be arranged or configured as a fallback system to maintain data transmission in the event of a failure of at least one of the channels which is provided for transmitting and/or receiving data over a communications network other than the motor vehicle electrical system. Advantageously, the motor vehicle electrical system is used for transmitting safety-related data.

The channels are separated from each other which may be by encoding the data to be transmitted using orthogonal codes, for example, CDMA (Code Division Multiple Access). Alternatively or additionally, the channels may be separated from each other by different carrier frequency positions, for example, FDMA (Frequency Division Multiple Access). In the CDMA method, all components (stations) use the same frequency range. The desired signal is encoded differently for each component. In the CDMA method, the encoding is based on spreading the payload channel. In the FDMA method, a frequency range used for transmitting information is divided into frequency sub-ranges according to the number of channels, and each channel is assigned a separate frequency sub-range. In this manner, the channels can be prevented from interfering with each other.

According to an exemplary embodiment of the present invention, it is proposed to use differential binary 2-phase shift keying for modulating the data to be transmitted with a carrier frequency. Alternatively, it is proposed to use differential quadrature phase shift keying (DQPSK) for modulating the data to be transmitted onto a carrier frequency. Of course, other sampling or transmission methods can be used as well.

To achieve an object of the exemplary embodiment and/or exemplary method of the present invention, based on the communications network of the type mentioned at the outset, the transmitter/receiver devices each have a plurality of transmitter units, each transmitter unit providing at least one separate channel for transmitting data over the communications network; and/or that the transmitter/receiver devices each have a plurality of receiver units, each receiver unit providing at least one separate channel for receiving data over the communications network.

The exemplary embodiment and/or exemplary method of the present invention provides for the communications network to include a motor vehicle electrical system used for supplying power to the components and for transmitting data between the components.

DETAILED DESCRIPTION

A transmitter/receiver device (so-called "transceiver") is divided into a transmitter section and a receiver section, both of which may be integrated on the same semiconductor support element (board). Moreover, the transceiver can be divided into a digital and an analog section. The transmitter section of the transceiver according to the present invention contains a plurality of transmitter units. Alternatively or additionally, the receiver section of the transceiver according to the present invention contains a plurality of receiver units.

Each transmitter unit provides at least one separate channel for transmitting data over a communications network. Each receiver unit provides at least one separate channel for receiving data over the communications network. Components of a motor vehicle which are connected to the communications network can obtain access to the network via the transceiver according to the present invention.

Figure 1:
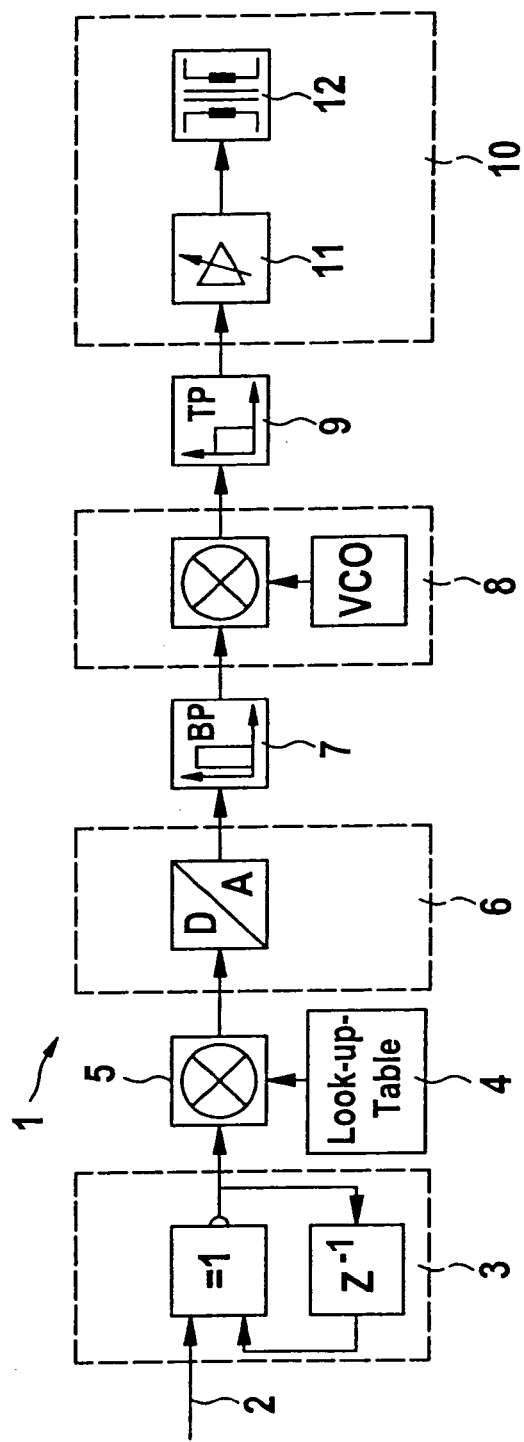
FIG. 1 shows a block diagram of a transmitter unit of a transmitter/receiver device according to the present invention in an exemplary embodiment.

FIG. 1 shows a transmitter unit of the transmitter section of the transceiver according to the present invention, the transmitter unit being denoted in its entirety by reference numeral 1. Transmitter unit 1 is connected to a motor vehicle component via a connection 2. Data is supplied to transmitter unit 1 via connection 2, the data being processed in transmitter unit 1 and coupled into a communications network. The data to be sent is differentially encoded within a digital section 3. Then, in a functional block 5, the signal is digitally modulated using a look-up table 4, in which a tabulated sine is stored. The tabulated sine values stored in look-up table 4 form the carrier signal for the modulation. Then, the digitally modulated signal is converted to the analog domain via a D/A converter 6, whereby the stepped carrier signal is smoothed.

After that, in a functional block 7, the analog signal is bandpass-filtered before, in a functional block 8, it is converted into a frequency range to be used for signal transmission. Due to the bandpass filtering in functional block 7, parasitic signals outside the frequency range used for signal transmission are filtered out. Conversion into the operating range is accomplished using a voltage-controlled oscillator (VCO). By converting the signal into the operating range via the VCO oscillator in functional block 8, the signal is shifted to the high-frequency (HF) range. The up-conversion is followed by low-pass filtering in functional block 9. During low-pass filtering, signal components having a frequency which, in the present exemplary embodiment, is above about 250 MHz are filtered out. Then, in a functional block 10, the signal is coupled into the communications network. In the present exemplary embodiment, the signal to be coupled in is initially amplified in an amplifier 11, and then inductively coupled into the communications network in a functional block 12.

In the present exemplary embodiment, the communications network takes the form of a motor vehicle electrical system, which is basically used for supplying power to the motor vehicle components connected thereto. The transceiver according to the present invention allows the motor vehicle electrical system to be also used for transmitting information between the components connected to the vehicle electrical system. The transmission of information over a motor vehicle electrical system is also referred to as "powerline communications".

Figure 2:
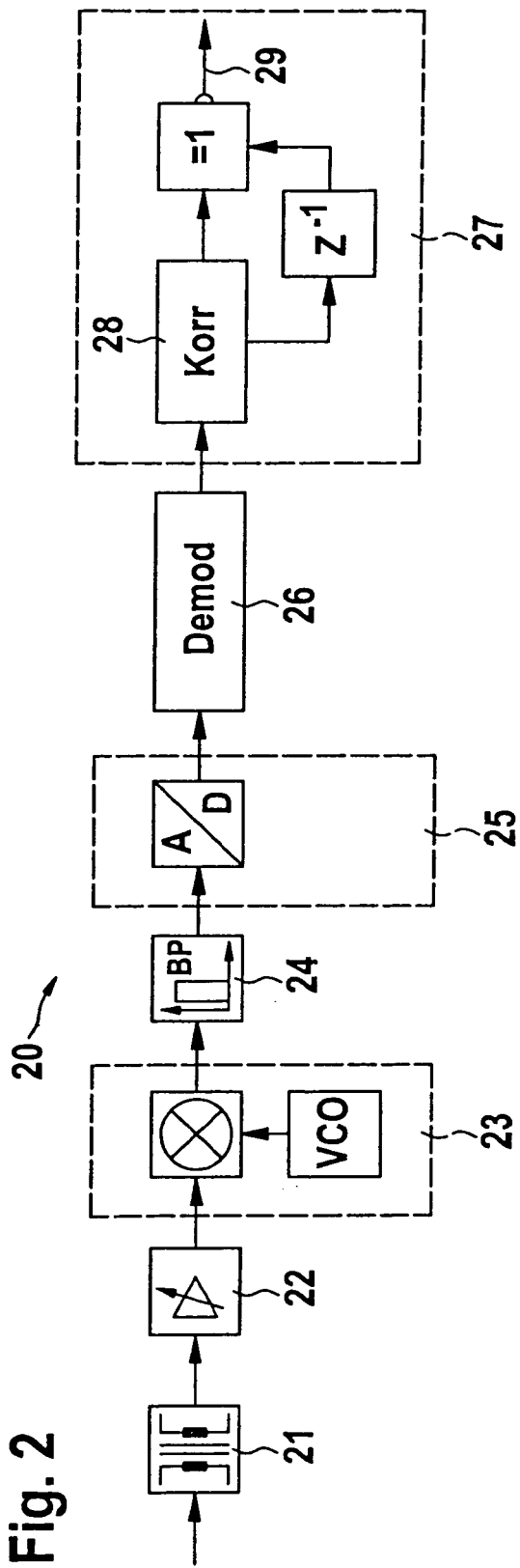
FIG. 2 shows a block diagram of a receiver unit of a transmitter/receiver device according to the present invention in an exemplary embodiment.

FIG. 2 shows a receiver unit of the receiver section of the transceiver according to the present invention, the receiver unit being denoted in its entirety by reference numeral 20. Using an inductive coupling element 21, a signal transmitted over the communications network is inductively coupled out of the network. In this exemplary embodiment too, the communications network may take the form of a motor vehicle electrical system. Subsequently, the level of the coupled-out signal is adapted by an amplifier 22 for further processing. After that, in a functional block 23, a voltage-controlled oscillator (VCO) performs a down-conversion from the frequency range of the signal transmission into the operating range of receiver unit 20.

This is followed by a bandpass filtering in a functional block 24, and an A/D conversion in a functional block 25 for the further processing in the digital section. The demodulation of the digital signal is performed in a demodulator 26. This is followed by data recovery in a functional block 27, including a correlator 28, as well as differential decoding of the received signal. The signals that have been received from the motor vehicle electrical system and processed are output to the connected motor vehicle component via a connection 29 of receiver unit 20.

If a plurality of bus systems are operated in parallel in the motor vehicle network, all transmitter units 1 and receiver units 20 in the receiver section and the transmitter section of the transceiver are duplicated a corresponding number of times. When using the same frequency for the carriers, the different channels must be separated by using orthogonal codes. Another possibility is to separate the channels by using different carrier frequencies. The carrier frequencies must be appropriately spaced apart in the available frequency band to prevent the individual channels from interfering with each other. The signal shapes used for transmission are selected to be orthogonal in the frequency domain so that the individual carrier frequencies can be placed relatively close together.

To perform the modulation (functional blocks 4 and 5 in FIG. 1), a relatively simple modulation method is used because in powerline communications, the channel provides enough bandwidth, and turns out to be relatively interference-free. Due to a maximum Euclidean distance of 2 in the signal space diagram and the associated very high insensitivity to additive interference, the modulation is performed using differential binary 2-phase shift keying (DBPSK). However, the use of differential quadrature phase shift keying (DQPSK) is also provided for. The differential modulation method has the advantage that only the phase difference between two consecutive bits is decisive for the information retrieval; i.e., there is no need for a reference carrier. Consequently, no reference carrier needs to be transmitted either.

Figure 3:
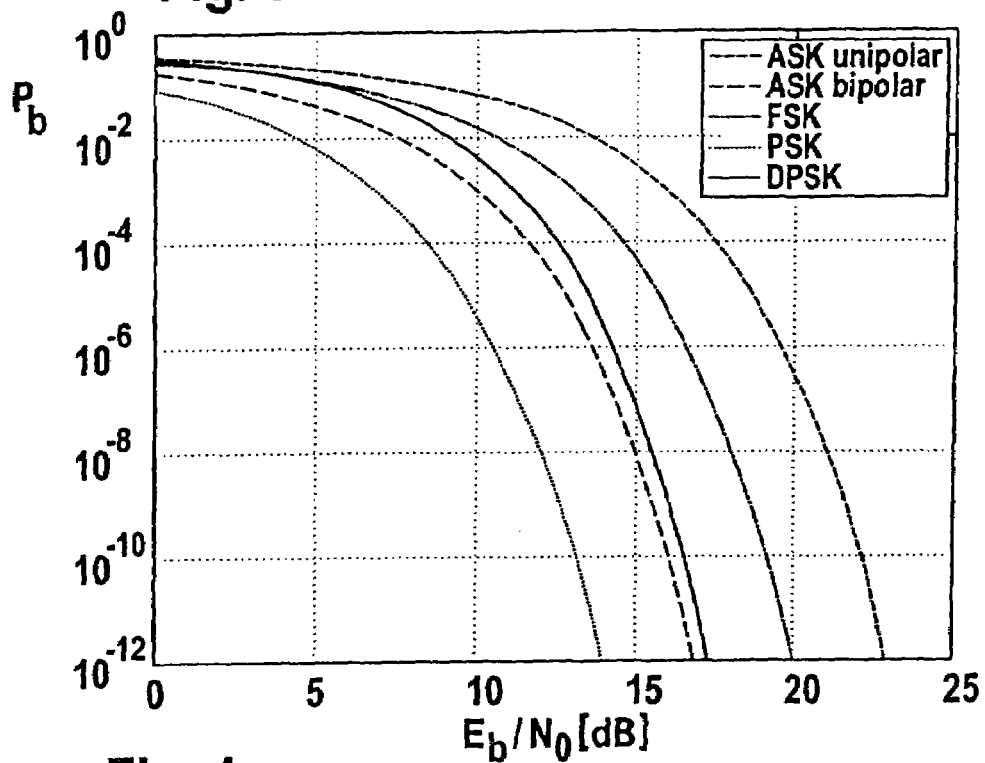
FIG. 3 depicts the bit error probability $P_b$ of different methods for data transmission over a motor vehicle electrical system as a function of the signal-to-noise ratio $E_b/N_o$.

FIG. 3 provides an overview of the bit error probability $P_b$ of different modulation methods. Specifically, FIG. 3 shows the unipolar and bipolar ASK (amplitude shift keying), FSK (frequency shift keying), PSK (phase shift keying), and DPSK (differential phase shift keying) modulation methods. These are two-level modulation methods. Bit error probability $P_b$ is plotted as a function of the quotient of bit energy $E_b$ and noise power density No. Quotient $E_b/N_o$ is also referred to as signal-to-noise ratio, and is plotted in the dB unit.

The use of a multi-level modulation method is possible, but appears not to be necessary because of the bandwidth available for data transmission in a motor vehicle electrical system. By dispensing with a multi-level modulation method, additional cost for the system arrangement or configuration can be saved. Moreover, two-level modulation methods work much more robustly than higher-level modulation methods. As a rule, higher-level modulation methods are more interference-prone than their lower-level variants.

Look-up table 4 contains discrete samples of a sinusoidal signal, which, in a mixer 5, are multiplied by data that has already been differentially encoded in functional block 3. The modulation itself is accomplished digitally using look-up table 4. This ensures "ideal" modulation without any phase offset between the carrier signal and the data bits to be transmitted.

The noisy desired signals are recovered again using correlator 28. For correlation, it is possible to use, inter alia, special sequences, which are referred to as "Barker sequences" (compare R. H. Barker: Group Synchronization of Binary Digital Systems. In Communication Theory, W. Jackson, Butterworth, 1953). These sequences feature a primary-to-secondary maximum ratio that corresponds to the number L of bits of the sequence. Therefore, it holds that:

$$HNV=L \qquad (1)$$

Barker sequences have a length L=2, 3, 4, 5, 7, 11 or 13. In R. Turyn, J. Storer: On Binary Sequences, Proceedings of American Mathematical Society, No. 12, 1961, it is shown that there are no further Barker sequences of odd length. In L. D. Baumert: Cyclic Difference Set, Springer Verlag, Berlin Heidelberg, 1971, it is demonstrated that there are no Barker sequences of even length greater than 4. Due to their high primary-to-secondary maximum ratio, these sequences are suitable, inter alia, for the most different synchronization tasks.

If synchronization is performed using a marker, there is the problem that, even in the case of a noiseless channel, the probability of incorrect synchronization is always greater than 0 as long as the marker can be combined from components of the character alphabet available for the succeeding data. This can only be avoided if data transmission is performed using an alphabet whose components do not allow the marker to be constructed therefrom. This is also true, in particular, for the case that two code words overlap. If, for example, the alphabet contains the two words $a=a_1 \ldots a_n$ and $b=b_1 \ldots b_n$, then the marker must not be able to be constructed by combining $a_j \ldots a_n b_1 \ldots b_{j-1}$, where $1<j=n$, either.

When using Barker sequences for frame synchronization, this can be achieved, inter alia, by using the Manchester code for the data. The Manchester code has the feature that, based on the Manchester code used, a state is maintained for a maximum of two bit periods. After that, is the state automatically changes. However, Barker sequences having a length L>4 generally contain at least one succession of three equal states.

The probability of incorrect synchronization can be generally calculated by the following equation:

$$P_r(f \mid RDL) = \sum_{i=1}^{\left[\frac{N}{L}-1\right]} \frac{(-1)^{i+j}}{i+1} \binom{N-L\_(L-1)}{i} \cdot M^{-Li} \quad (2)$$

Here, M stands for the number of symbols of the modulation method used. Thus, in the case of DBPSK, it holds that M=2. L corresponds to the length of the synchronization word in general and, in this particular case, to the length of the Barker sequence. N represents the total length of the data frame to be transmitted, including L and length D of the data block (N=L+D).

Figure 4:
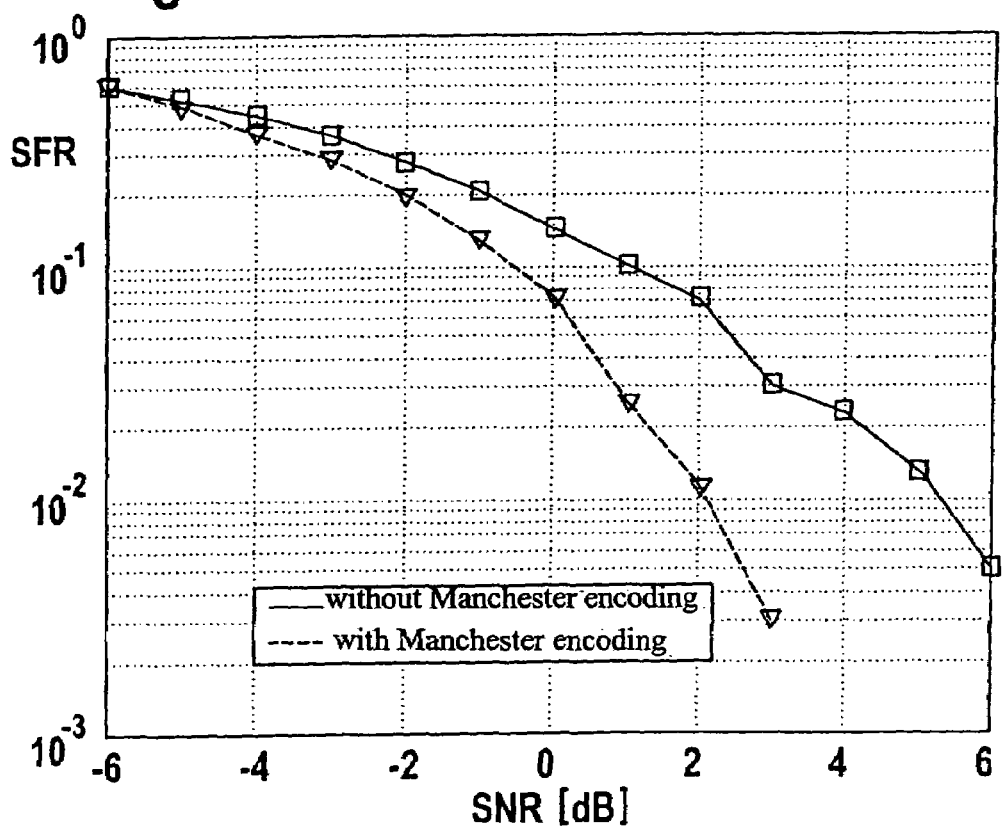
FIG. 4 shows a comparison of a synchronization error rate with and without additional Manchester encoding.

FIG. 4 shows the difference between a data word character alphabet that may contain the synchronization word, and an alphabet in which this is ruled out by an additional Manchester encoding. However, the low probability of incorrect synchronization due to the use of the Manchester encoding is bought at the expense of halving the potential data rate. As can be seen from FIG. 4, this is no longer important in the case of high noise levels because the probability that the data word to be sent is corrupted by noise is significantly greater than the probability of a conditional incorrect synchronization. However, at low noise levels, this becomes clearly noticeable.

Altogether, 1,000 simulations were included in the evaluation for each integer value of the signal-to-noise ratio (SNR) between −6 through +6 dB. 130 bits were generated randomly. The 14-bit long synchronization word was randomly placed within this bit stream. This was followed by a PSK modulation, the addition of noise of a corresponding SNR, as well as the demodulation. After that, synchronization was performed. Starting at a value of about 4 dB, no more errors occurred for the data word synchronization using additional Manchester encoding. In the logarithmic representation, this corresponds to a synchronization error rate SFR of −∞. For this reason, no data points are plotted in FIG. 4 for an SNR of 4, 5 and 6 dB.

To calculate the position of the beginning of the synchronization word, both the correlation method and the maximum likelihood rule according to Massey (so-called "ML rule") can be used. Here, according to J. L. Massey: Optimum Frame Synchronization, IEEE Transactions an Communications, Vol. COM-20, No. 2, 1972, the following equation applies:

$$L_H(\mu) = \sum_{i=0}^{L-1} y_{i+\mu} \cdot S_i - \frac{N_0}{2} \sum_{l=0}^{L-1} \ln\left(\cosh\left(\frac{2\sqrt{E_S} \cdot y_{i+\mu}}{N_0}\right)\right) \quad (3)$$

Assuming a signal-to-noise ratio of $$\frac{E_S}{N_0} \ll 1$$

results in the following approximation:

$$L_H(\mu) = \sum_{i=o}^{L-1} \left(y_{i+\mu} \cdot S_i - \sqrt{E_S} \, |y_{i+\mu}|\right) \quad (4)$$

Here, the variables $S_i$ represent the elements of the synchronization word, and the variables $y_i$ represent the elements of the received data word. The second part of the equation takes into account the correlation value component resulting from the correlation of the synchronization word and the data word. This is intended to correct the output value of correlator 28 accordingly.

The correlation rule follows from equation (4), neglecting the correction term:

$$L_H(\mu) = \sum_{i=0}^{L-1} y_{i+\mu} \cdot S_i \quad (5)$$

Especially for the differential binary 2-phase shift keying (DBPSK), the following calculation procedure is established according to the maximum likelihood rule:

$$L_H(\mu) = \sum_{i=0}^{L-1} \left(\frac{1}{\sqrt{E_S}} y_{i+\mu} \cdot S_i - |y_{i+\mu}|\right) \quad (6)$$

Figure 5:
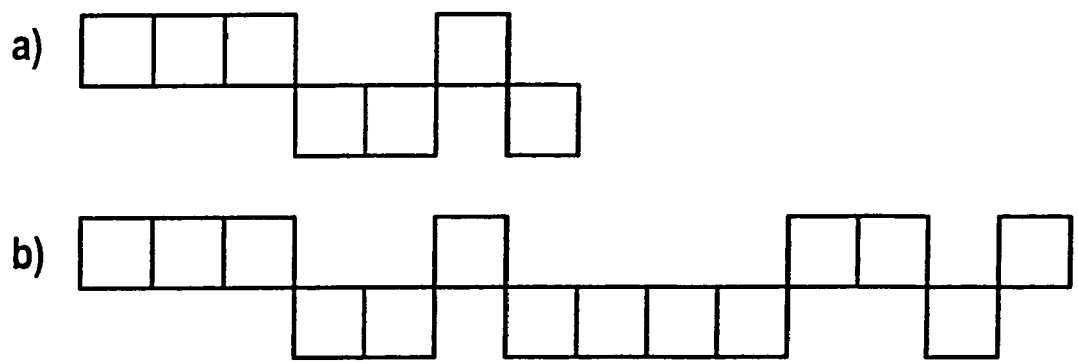
FIG. 5 depicts different Barker sequences for frame and transmission cycle synchronization.

Barker sequences can be used primarily for frame and transmission cycle synchronization. In this context, one idea is to use the same Barker sequence both for the frame synchronization and for the transmission cycle synchronization. To this end, for example, a Barker sequence having a length L=7 is used for frame synchronization. For synchronization to the beginning of the transmission cycle, a slightly modified sequence is constructed from the same sequence by stringing together two of the same sequences. However, the second sequence is inverted in terms of the values of the individual bits. This is shown in FIG. 5.

FIG. 5a shows a Barker sequence having a length L=7 for frame synchronization. FIG. 5b shows a Barker sequence for transmission cycle synchronization; the first seven bits of the Barker sequence of FIG. 5b corresponding to the Barker sequence of FIG. 5a. The following seven bits of the Barker sequence of FIG. 5b correspond to the inverted first seven bits of the sequence. This has the advantage that only the Barker sequence of length L=7 must be stored in the receiver unit. The correlation in correlator 28 is performed using only the Barker sequence of FIG. 5a. The Barker sequence for transmission cycle synchronization according to FIG. 5b can be obtained from the Barker sequence of FIG. 5a by a logical operation in the receiver unit.

To create the correlator output function, an additional addition is introduced in the synchronization to the beginning of the transmission cycle. In a first step, the correlation with the Barker sequence is performed. This yields the result x(k). After that, a modified output function Xmod(k) is calculated according to the following rule:

$$x_{mod}(k) = x(k) - x(k+L) \quad (7)$$

Correlation of the Barker sequence with the inverted component in the modified Barker sequence yields the same output function as when the Barker sequence is crosscorrelated, but mirrored into the negative number domain. Thus, the calculation procedure according to equation (7) yields the same function profile for the existence of the modified Barker sequence as for the cross-correlation of the Barker sequence, but with double amplitude values. Therefore, the markers for frame synchronization and for transmission cycle synchronization can be distinguished using a simple threshold discriminator.

Figure 6:
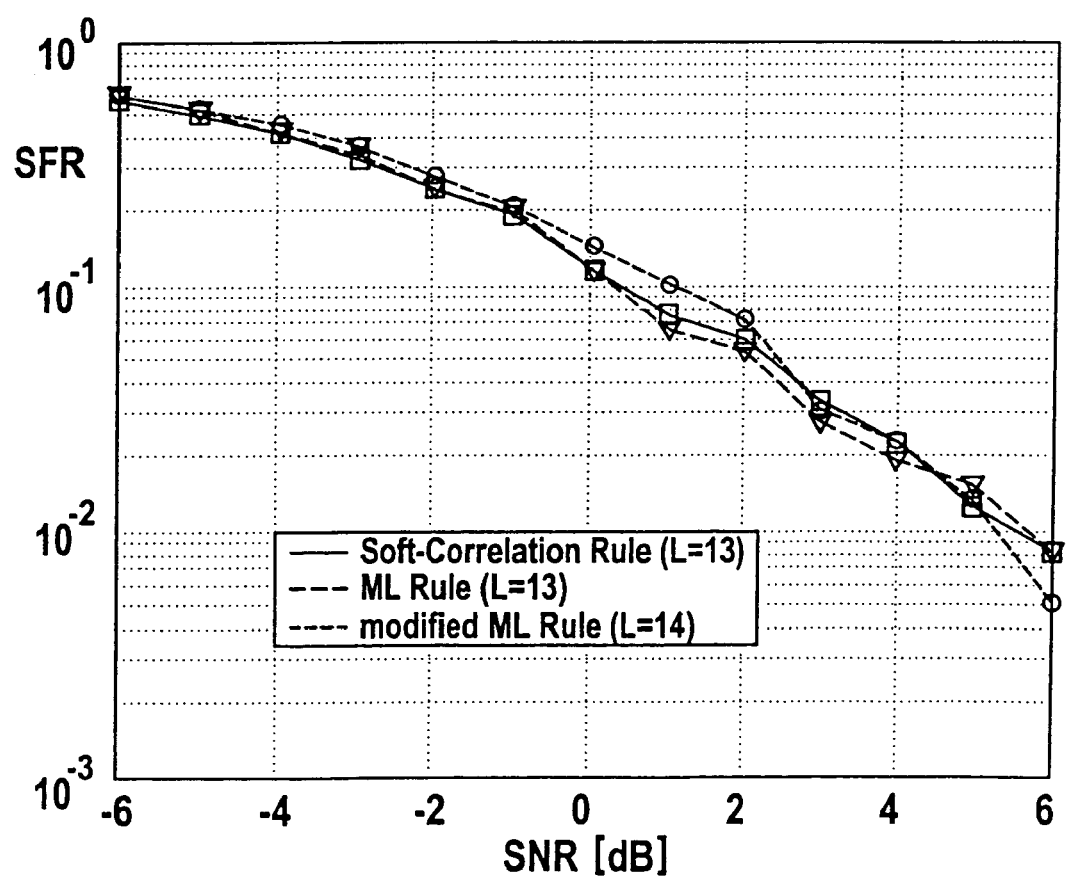
FIG. 6 shows a comparison of the synchronization error rate for a Barker sequence having a length L=13 and a modified Barker sequence having a length L=14.

FIG. 6 shows a comparison between the synchronization using an original Barker sequence and a Barker sequence that has been modified according to the procedure described above and is of nearly the same length (an identical length cannot be achieved because, as mentioned earlier, there are only odd Barker sequences of L>4). It can be seen in FIG. 6 that synchronization using the original Barker sequence and synchronization using the modified Barker sequence of similar length yield approximately the same results. FIG. 6 shows the synchronization for a conventional correlation rule (soft correlation rule), for the maximum likelihood rule (ML rule), and for the modified maximum likelihood rule (modified ML rule).

Figure 7:
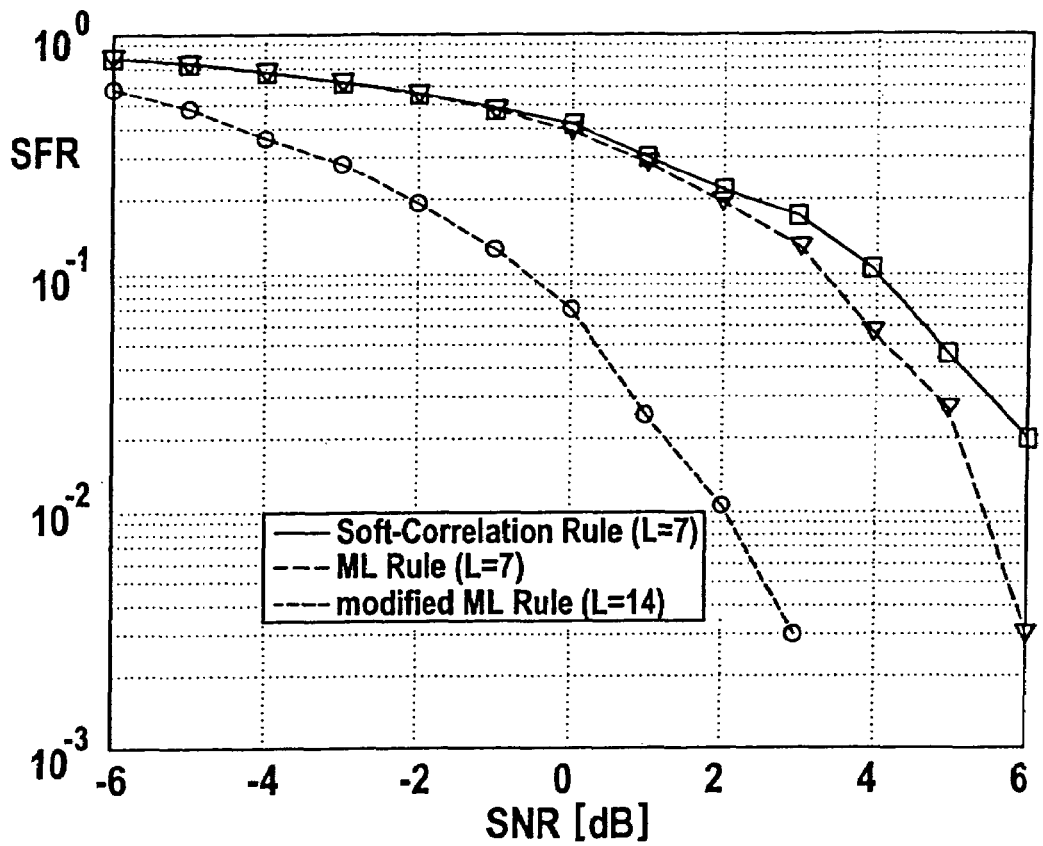
FIG. 7 depicts a frame and transmission cycle synchronization using a Barker sequence having a length L=7 and a modified Barker sequence which is constructed therefrom and has a length L=14.

FIG. 7 shows results for the frame synchronization and the transmission cycle synchronization using a Barker sequence having a length L=7 and a modified Barker sequence which is constructed therefrom and has a length L=14. It can clearly be seen that the frame synchronization for an SNR>6 dB is also always successful. Another possibility for synchronization is also provided by so-called "Lindner sequences (vgl. H. D. Luke: Korrelationssignale (correlation signals), Springer-Verlag Berlin/Heidelberg 1992). Additionally, Manchester encoding was performed to be able to allow error-free synchronization.

In the transceiver according to the present invention, one or more of the channels can be reserved as special channels for transmitting messages that are of extreme relevance for safety, or for diagnosis of the communications network or of the data transmission over the network. To provide the special channels, different procedures present themselves in order to prevent the channels from interfering with each other. One procedure is to use orthogonal codes at the same frequency position. However, this can be problematic due to the required length of the code words, because this makes high-rate data transmission more difficult. Another procedure is to use signal shapes that are orthogonal in the frequency spectrum.

The reception of the special messages can be accomplished using so-called "matched filters". These can be implemented either digitally, or using so-called SAW (surface acoustic wave) filters. These can be optimally adapted. A further advantage of SAW filters is that they are passive components. Consequently, they do not consume any quiescent current. To safeguard the detection, it is possible to use Barker sequences also for these messages. However, it must be ensured in general that no false alarm can occur. This places very high demands on the overall system. Here, Barker sequences of great length could be used for signaling because, as mentioned earlier, these sequences have a maximum primary-to-secondary maximum ratio. To minimize the effect of short-duration noise, it is necessary here to pay attention that the individual bits used have a bit period of sufficient length. In addition, it is possible to use orthogonal or inverted Barker signals for the different special channels.

Figure 8:
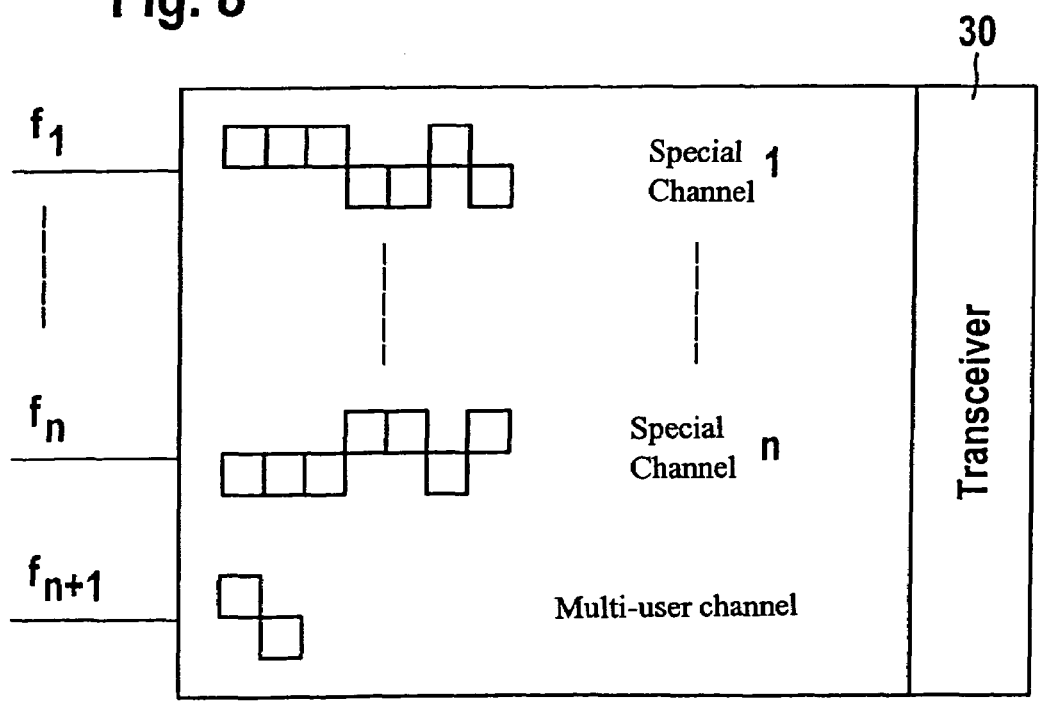
FIG. 8 shows an inventive transmitter/receiver device having n special channels separated by the frequency position, and one multi-user channel.

FIG. 8 is a rough schematic representation of the options described above, showing an inventive transceiver 30 having n special channels $f_1 \ldots f_n$ separated by the frequency position, as well as a so-called multi-user channel $f_{n+1}$. In addition, the status of each special channel should be polled cyclically to be constantly informed of the status of the component that obtains access to the communications network via the transceiver, and thus to be able to respond to a possible defect in a timely manner. This polling could, for example, also be performed via the multi-user channel $f_{n+1}$.

The present patent application proposes a transceiver for use in powerline communications as the communications medium. An important aspect in this context is the introduction of special channels for safety-related messages that have to be transmitted without any time delay caused by a multi-user protocol. For signaling on these channels, inter alia, Barker sequences are proposed. These sequences are also proposed for synchronization tasks on the multi-user channel. The special channels and the multi-user channel can be separated both by orthogonal codes and by using orthogonal frequency positions.

Figure 9:
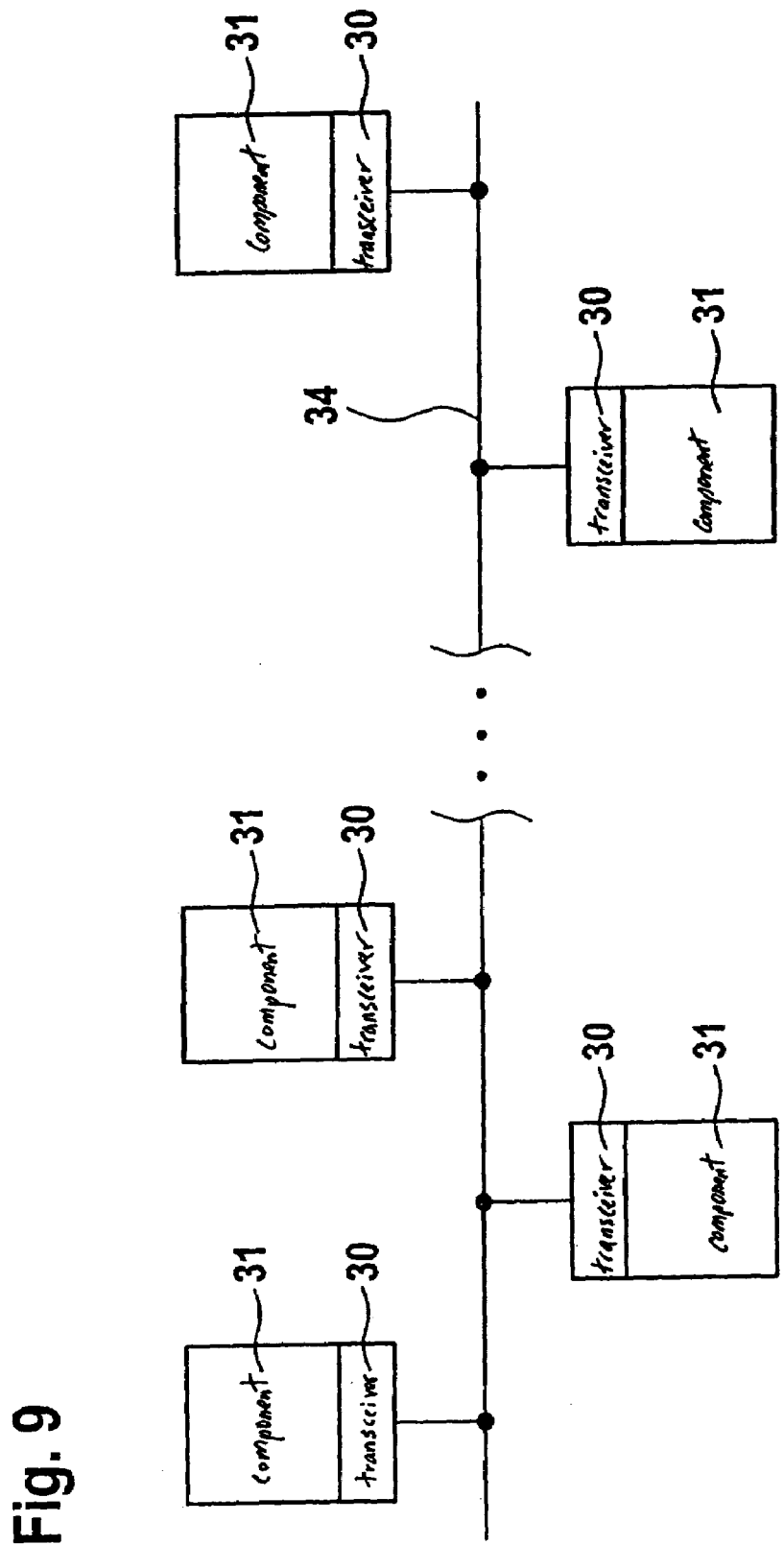
FIG. 9 shows an exemplary embodiment of a communications system according to the present invention.

FIG. 9 shows a communications system according to the present invention in a motor vehicle. The system includes a motor vehicle electrical system 34 and a plurality of motor vehicle components 31 connected thereto. Motor vehicle electrical system 34 used for supplying power to motor vehicle components 31. Moreover, motor vehicle electrical system 34 is used for transmitting information between components 31. To this end, components 31 are provided with a transmitter/receiver device 30 (transceiver), via which they have access to the motor vehicle electrical system. This type of data transmission is also referred to as "powerline communications".

Figure 10:
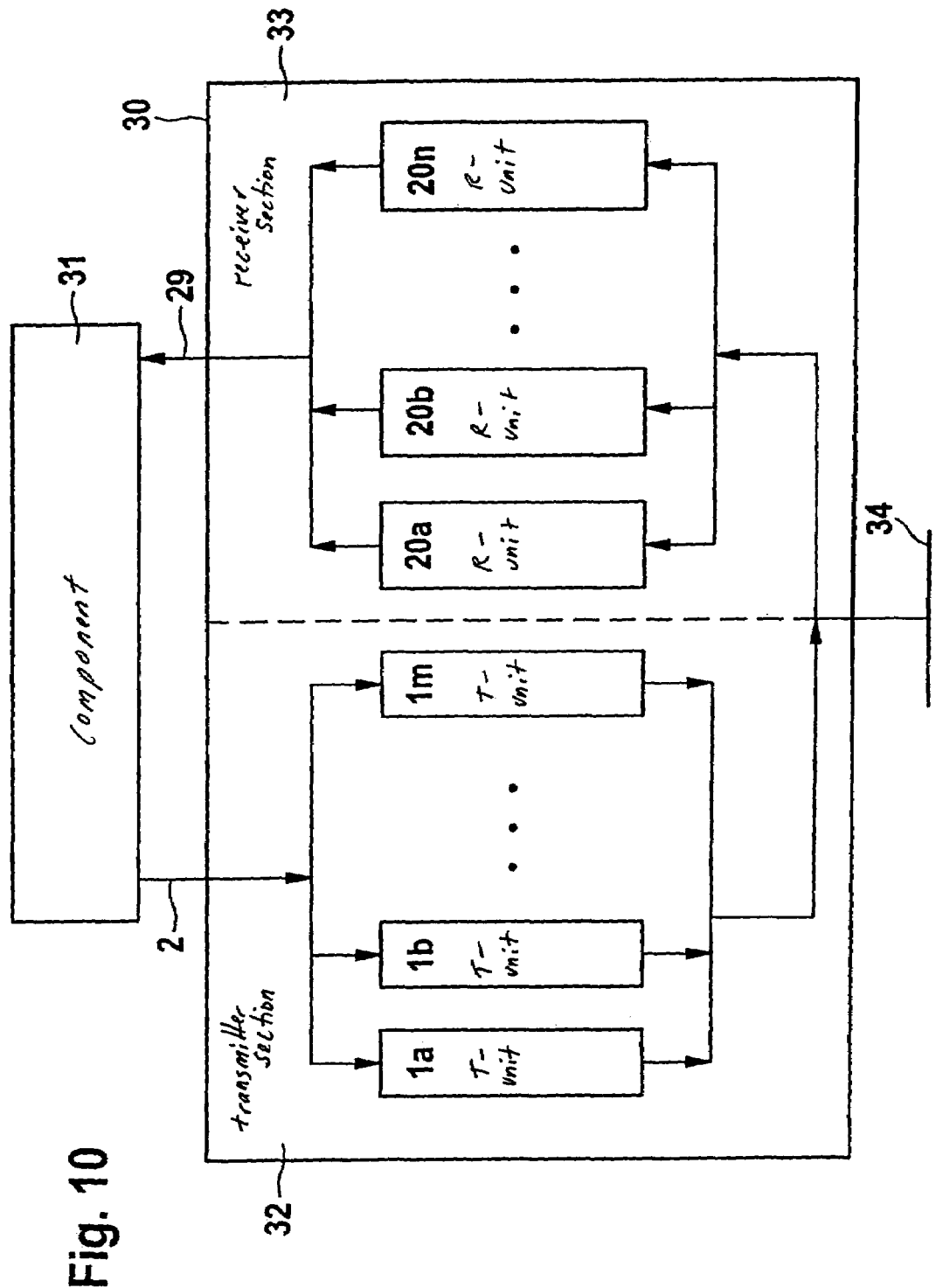
FIG. 10 shows an inventive transmitter/receiver device of the communications system of FIG. 9 according to an exemplary embodiment.

FIG. 10 is a detail view of a transceiver 30 according to the present invention. Transceiver 30 includes a transmitter section 32 and a receiver section 33. Via connection 2, data to be transmitted over motor vehicle electrical system 34 is received by receiver section 32 from the component 31 connected to transceiver 30. Data that has been coupled out of the motor vehicle electrical system and processed by receiver section 33 is transmitted via connection 29 to the component 31 connected to transceiver 30.

Transmitter section 32 of the transceiver 30 according to the present invention includes a plurality of transmitter units $1a, 1b, \ldots 1m$. Similarly, receiver section 33 of transceiver 30 includes a plurality of receiver units $20a, 20b, \ldots 20n$. Both the transmitter units 1 and the receiver units 20 are connected to motor vehicle electrical system 34 via a capacitive coupler 12, 21 (compare FIG. 1) at low frequencies.

What is claimed is:

1. A transmitter/receiver device for a motor vehicle component connected to a communications network, comprising:
   at least one transmitter unit for transmitting data over the communications network; and
   at least one receiver unit for receiving data over the communications network, the communications network being used for transmitting data between the component and further components connected to the communications network;
   wherein at least one of the following is satisfied:
      the transmitter/receiver device includes a plurality of the transmitter units, each of the transmitter units providing at least one separate channel for transmitting data over the communications network, and
      the transmitter/receiver device includes a plurality of the receiver units, each of the receiver units providing at least one separate channel for receiving data over the communications network; and
   wherein parallel operation of a plurality of bus systems is implemented using at least one of (i) the plurality transmitter units and (ii) the plurality of receiver units in the communications network, the communications network being a single common communications network.

2. The transmitter/receiver device of claim 1, wherein at least one of the channels is for at least one of transmitting and receiving data over a motor vehicle electrical system, the motor vehicle electrical system being used for supplying power to the component and for transmitting data between the component and further components connected to the motor vehicle electrical system.

3. The transmitter/receiver device of claim 2, wherein at least one of the transmitting and the receiving of data over the motor vehicle electrical system is a fallback system to maintain data transmission in the event of a failure of at least one of the channels which is provided for at least one of transmitting and receiving data over a communications network other than the motor vehicle electrical system.

4. The transmitter/receiver device of claim 2, wherein the motor vehicle electrical system is used for transmitting safety-related data.

5. The transmitter/receiver device of claim 1, wherein the channels are separated from each other by encoding the data to be transmitted using orthogonal codes.

6. The transmitter/receiver device of claims 1, wherein the channels are separated from each other by modulating the data to be transmitted onto different carrier frequencies.

7. The transmitter/receiver device of claim 1, wherein differential binary 2-phase shift keying (DBPSK) is used for modulating onto a carrier frequency the data to be transmitted.

8. The transmitter/receiver device of claim 1, wherein differential quadrature phase shift keying (DQPSK) is used for modulating onto a carrier frequency the data to be transmitted.

9. A communications system located in a motor vehicle, comprising:

a communications network and, connected thereto, a plurality of motor vehicle components, each having a transmitter/receiver device including at least one transmitter unit for transmitting data over the communications network, and at least one receiver unit for receiving data over the communications network, which is used for transmitting data between the components;

wherein at least one of the following is satisfied:

the transmitter/receiver devices each include a plurality of transmitter units, each transmitter unit providing at least one separate channel for transmitting data over the communications network, and the transmitter/receiver devices each include a plurality of receiver units, each receiver unit providing at least one separate channel for receiving data over the communications network; and wherein parallel operation of a plurality of bus systems is implemented using at least one of (i) the plurality transmitter units and (ii) the plurality of receiver units in the communications network, the communications network being a single common communications network.

10. The communications system of claim 9, wherein the communications network includes a motor vehicle electrical system used for supplying power to the components and for transmitting data between the components.

* * * * *